United States Patent [19] [11] 3,712,750
Healy [45] Jan. 23, 1973

[54] INDEXING
[75] Inventor: James W. Healy, Wakefield, Mass.
[73] Assignee: Cambridge Engineering Inc., Waltham, Mass.
[22] Filed: Dec. 24, 1970
[21] Appl. No.: 101,289

[52] U.S. Cl. ..................................408/3, 90/62 A
[51] Int. Cl. ......................B23q 35/128, B23q 35/18
[58] Field of Search...........................408/3; 90/62 A

[56] References Cited

UNITED STATES PATENTS

| 3,232,142 | 2/1966 | Deckl et al. | 408/3 |
| 3,163,057 | 12/1964 | Drummond et al. | 408/3 |
| 3,532,893 | 10/1970 | Marantette et al. | 408/3 X |

Primary Examiner—Andrew R. Juhasz
Assistant Examiner—Z. R. Bilinsky
Attorney—Gordon R. Williamson

[57] ABSTRACT

Improvement in worktable apparatus having X and Y drive units for producing relative table-to-tool movements along perpendicular X and Y axes, respectively; the improvement consisting of indexing and cycling mechanisms for controlling table-to-tool movement and cycling of a tool unit, comprising a template having at least one physical characteristic varying along both the axes in accordance with the desired pattern of the movement and the cycling; first and second sensors, the template and the sensors being mounted to undergo relative sensor-to-template movement in correspondence to the relative table-to-tool movement, the first sensor being responsive to a physical characteristic to provide table stop signals, the second sensor being responsive to a physical characteristic to provide table direction signals, one of the sensors being responsive to a physical characteristic to provide work cycle signals; and logic circuitry responsive to the sensors to cause the drive units to stop the relative movements in response to a table stop signal, to cause the tool unit to carry out the work cycle in response to a work cycle signal, and to cause the drive units to renew the relative movements in accordance with the table direction signals or hold the stop position in the absence of table direction signals.

6 Claims, 8 Drawing Figures

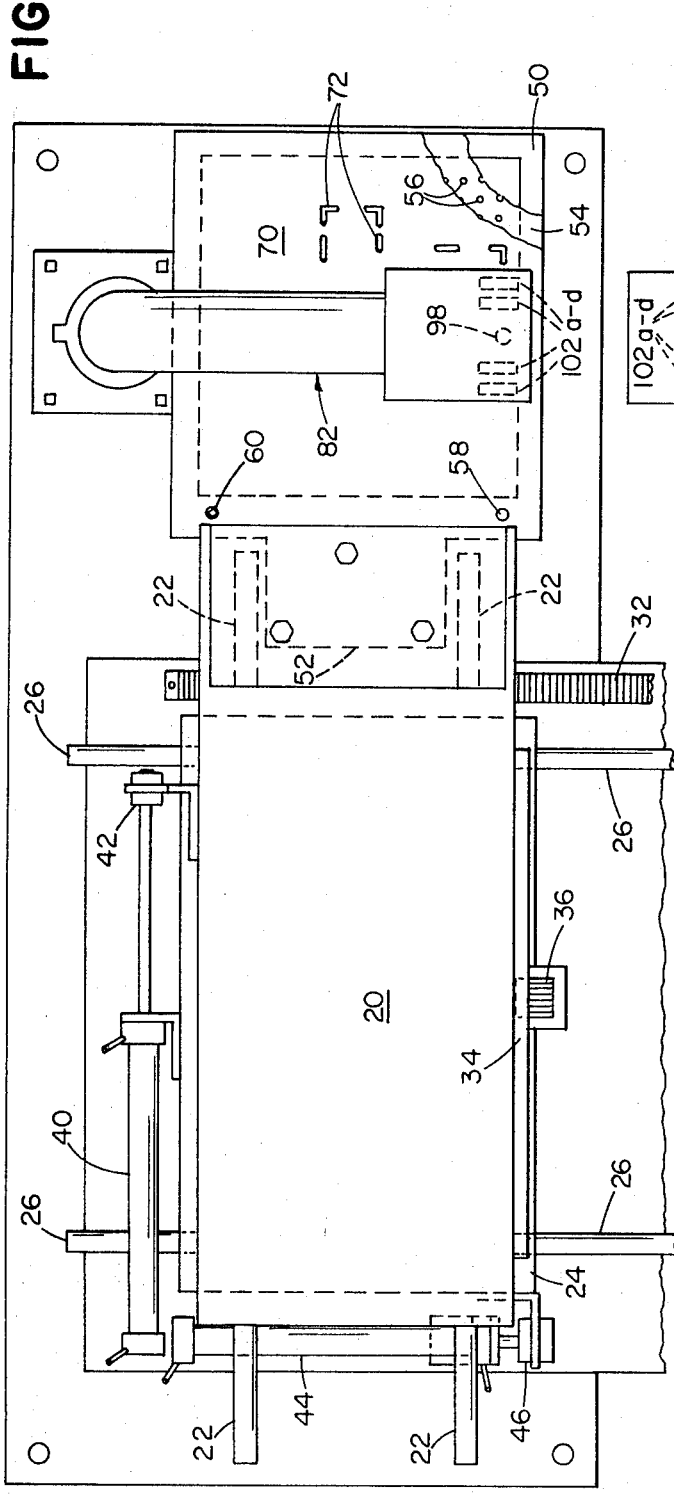

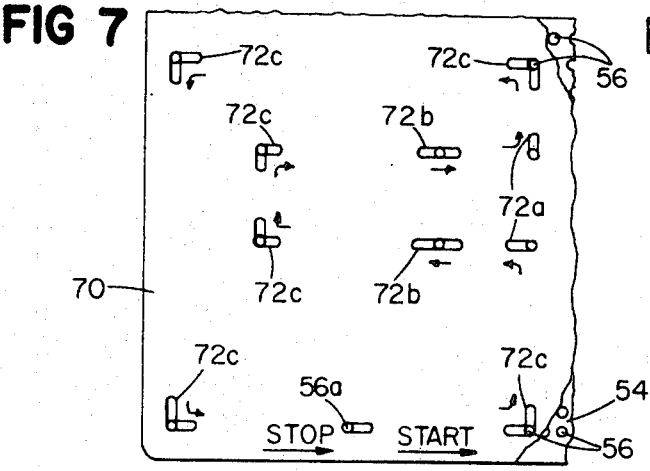
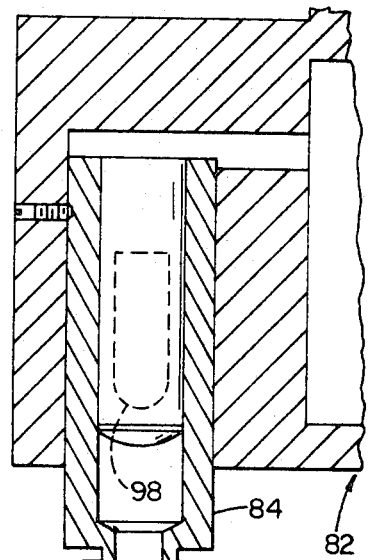
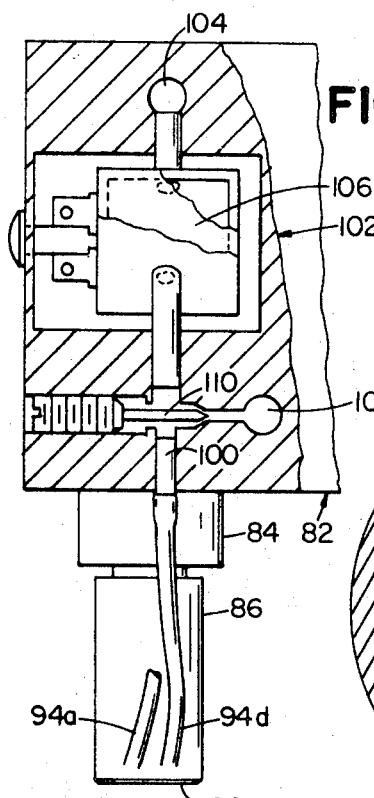
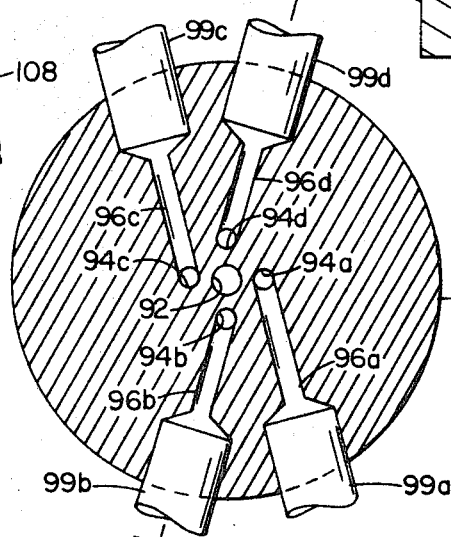
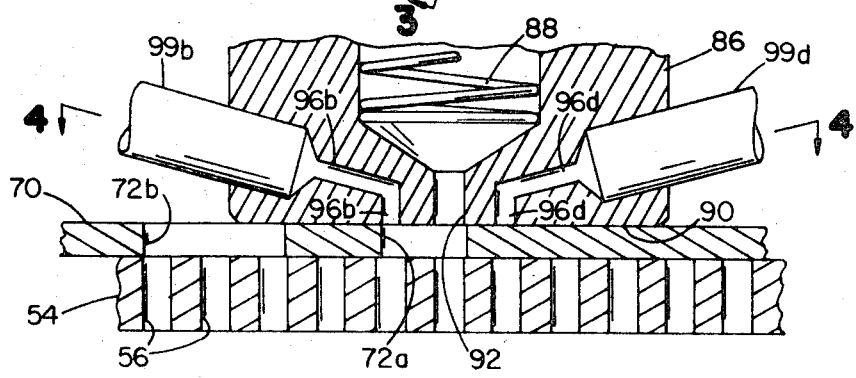

INDEXING

This invention relates to indexing worktables.

Objects of the invention are to provide for highly accurate, automatic indexing in rapid response to program signals, and flexible, easily changed programming, with apparatus having performance capability of numerical control but at lower cost, and in which any errors are non-accumulating.

In general the invention features an improvement in worktable apparatus having X and Y drive units for producing relative table-to-tool movements along perpendicular X and Y axes, respectively; the improvement consisting of indexing and cycling mechanisms for controlling table-to-tool movement and cycling of a tool unit, comprising a template having at least one physical characteristic varying along both the axes in accordance with the desired pattern of the movement and the cycling; first and second sensors, the template and the sensors being mounted to undergo relative sensor-to-template movement in correspondence to the relative table-to-tool movement, the first sensor being responsive to a physical characteristic to provide table stop signals, the second sensor being responsive to a physical characteristic to provide table direction signals, one of the sensors being responsive to a physical characteristic to provide work cycle signals; and logic circuitry responsive to the sensors to cause the drive units to stop the relative movements in response to a table stop signal, to cause the tool unit to carry out the work cycle in response to a work cycle signal, and to cause the drive units to renew the relative movements in accordance with the table direction signals if present. In preferred embodiments the template characteristic varies discontinuously along the axes, and the sensors are respectively exclusively responsive to two such characteristics, which comprise transmissivity of the template to light and air; the first sensor is a photosensitive device; the second sensor is a pressure-sensitive device consisting of four pressure differential operated switches respectively corresponding to the four directions along the axes, and a pressure control member having four exhaust openings respectively communicating with the switches and normally effectively sealed by the template; the template has local areas of high light transmissivity, and local areas of high air transmissivity respectively extending from the areas of high light transmissivity in the respective directions of desired renewal of said relative movements, each area of high air transmissivity being arranged to align with an exhaust opening upon alignment of the photosensitive device with the corresponding area of high light transmissivity, there being selected additional areas of high air transmissivity respectively extending from the areas of high light transmissivity in the trailing direction of the relative movement prior to the alignment, the logic circuitry being responsive to simultaneous air exhaustion through a pair of exhaust openings to cause the tool unit to carry out the work cycle; the template consists of a plate having a rectangular grid of uniformly spaced holes, and a program mask for selectively exposing some of the holes and covering others; the second sensor is responsive to a physical characteristic of the template to provide the work cycle signals; the logic circuitry includes a memory responsive to a switch corresponding to an exhaust opening aligned with an area of high air transmissivity to prevent one of the selected additional areas of high air transmissivity adjacent a subsequent area of high light transmissivity with which the photosensitive device is aligned from effectively causing a switch to provide a table direction signal; and table locking mating racks are provided for determining a series of standard index positions for the table, and for correcting, after the table is stopped, any deviation of the table from the nearest standard position, the drive units being connected to the apparatus through compliant couplings to accommodate the correcting.

Other objects, advantages, and features of the invention will be apparent from the following description of a preferred embodiment thereof, taken together with the drawings in which:

FIG. 1 is a side elevation of apparatus embodying the invention;

FIG. 2 is a top plan view of the apparatus of FIG. 1;

FIG. 3 is a sectional view of a portion of the apparatus, taken along 3—3 of FIG. 4;

FIG. 4 is a sectional view taken along 4—4 of FIG. 3;

FIG. 5 is a vertical sectional view of another portion of the apparatus;

FIG. 6 is a vertical sectional view of a pressure differential operated switch;

FIG. 7 is a diagrammatic plan of a fragment of a template; and

Figure 8:
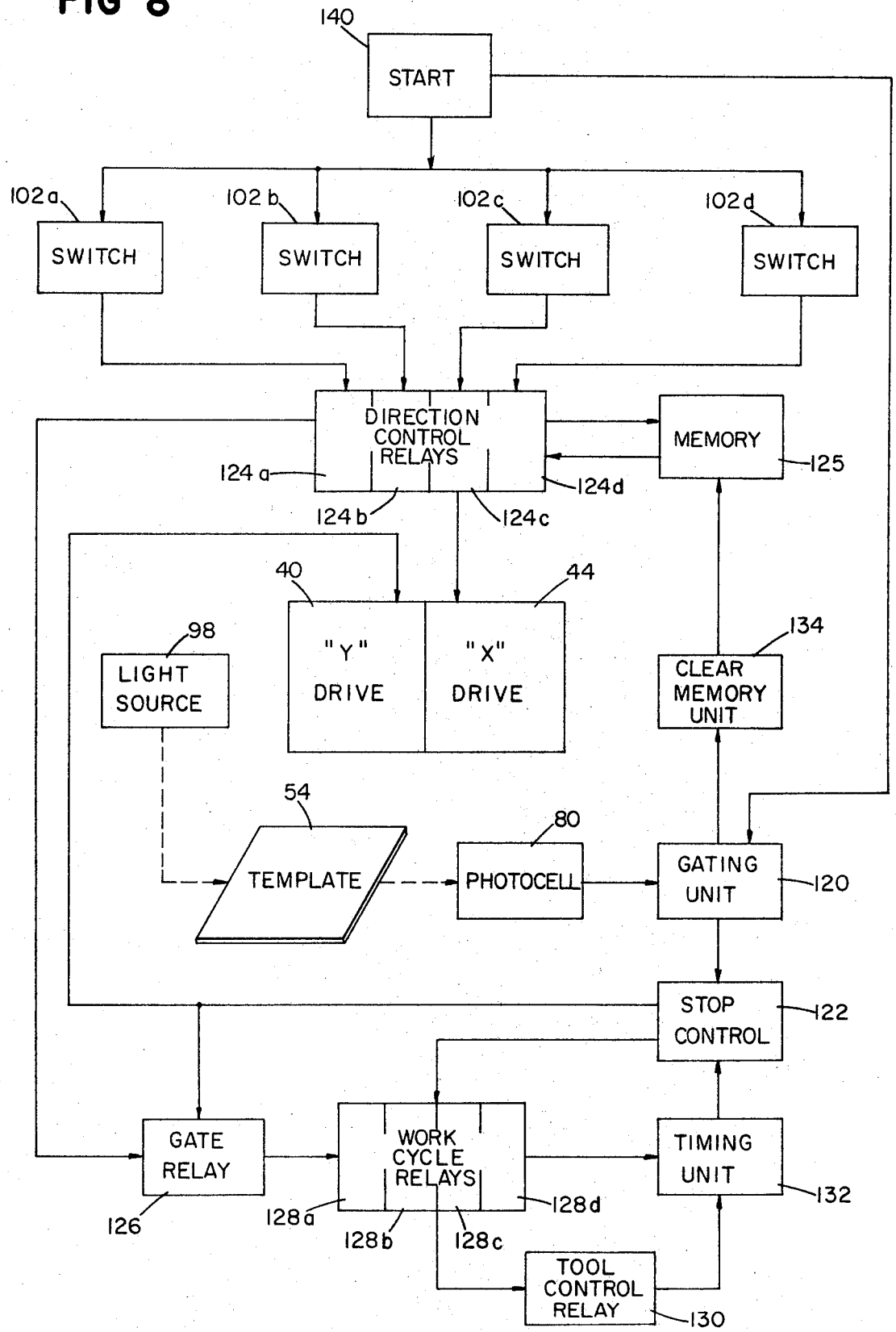
FIG. 8 is a block diagram of the logic circuitry.

Referring to the drawings, X–Y worktable 20 is mounted for left-to-right indexing on rods 22 supported in carriage 24, and carriage 24 is in turn mounted on rods 26 supported on frame 28 to permit in-out indexing of the table.

For highly accurate in-out indexing, solenoid actuated 0.1 inch pitch rack 30 is fixed to carriage 24 to mate with rack 32 fixed to frame 28. Racks 34, 36, respectively fixed to table 20 and carriage 24, are similarly provided for left-right indexing.

Table-actuating hydraulic cylinder 40 is fixed to carriage 24 and has its piston rod connected to table 20 through compliant coupling 42, which accommodates slight corrections in table movement upon the mating of racks 34 and 36. Similarly, carriage-actuating hydraulic cylinder 44 is fixed to frame 28 and has its rod connected to carriage 24 through compliant coupling 46.

A tool unit 48 (e.g. a drill) is mounted above table 20.

Rectangular template support frame 50 is cantilevered at one side of table 20, frame extension 52 being solidly bolted to the table. Mounted on frame 50 is master template 54, consisting of a steel plate through which holes 56 (0.040 inch diameter on 0.1 inch centers) are drilled in a rectangular grid pattern with rows and columns (of, e.g., 100 holes each) respectively parallel to the X and Y axes of movement of table 20. Dowel pin 58 and diamond pin 60 ensure accurate, repeatable alignment of template 54 on the frame.

Template mask 70 (e.g. of a soft opaque polyethylene, one thirty-second inch thick) overlies template 54, and has a pattern of slots 72 which are larger than, but aligned with, selected holes 56. Slots 72 control the movement of table 20 and the actuation of tool 48, as described below.

Mounted in fixed position slightly below template 54, inside frame 50, is photoelectric cell 80 (FIGS. 1, 5).

Fixed just above the template is a head 82 from which depends a hollow guide 84 (FIG. 5) around which fits a shell 86 (FIGS. 1, 3–5) biased by spring 88 against mask 70. Through the bottom wall 90 of shell 86 extend central light hole 92 which communicates with the hollow interior of guide 84, and four air holes 94a–d spaced 90° apart on a circle coaxial with hole 92. Each air hole 94a–d communicates with a passage 96a–d through the wall of shell 86.

Light source 98 is positioned inside guide 84.

Air passages 96a–d are respectively connected through tubes 99a–d to orifices 100 (FIG. 6) of four normally open pressure differential operated switches 102a–d (FIG. 1). Each switch 102a–d is supplied with air at a fixed pressure (e.g. 2 p.s.i.g.) through orifice 104 on one side of a flexible membrance 106, and is supplied with air at a slightly higher pressure (e.g. 3 p.s.i.g.) through orifice 108 and adjustable needle valve 110 on the other side of membrane 106. Orifice 100 communicates with the high pressure side of membrane 106.

Slots 72 are of the following forms (FIG. 7): slots 72a extend from a hole 56 in one direction perpendicular to the axis of current table movement, and are used to cause a turn of the table (as indicated by the arrows) without actuation of tool 48; slots 72b extend both sides of a hole 56 along the axis of current table movement and are used to cause actuation of tool 48 without a change of table direction; slots 72c are L-shaped, and extend from a hole 56 both in the trailing direction of table movement and in the direction of a desired table turn, and are used to cause tool actuation and turn of the table. When no slots are present at a hole 56 (as hole 56a of FIG. 7), there will, of course, be no movement from that stop position without operator intervention (i.e., an end of program stop occurs).

Switches 102a–d and photoelectric cell 80 are electrically connected through logic circuitry to control the operation of hydraulic cylinders 40 and 44, and to control the actuation of tool 48.

In operation, one of cylinders 40, 44 will be actuated to start table 20 and frame 50 in motion along the X or Y axis. Except where a slot 72 appears mask 70 will block transmission of light to cell 80, and will seal holes 94a–d sufficiently to keep switches 102a–d open. When a slot 72 and grid hole 56 become aligned with light hole 92 light passes from source 98 to cell 80 to stop the table, and one or two of air holes 94a–d will be positioned over slot 72 so that the high pressure side(s) of the corresponding switch(es) 102a–d will be momentarily exhausted, closing the switch(es).

The heart of the logic circuitry is shown schematically in FIG. 7, conventional electrical and hydraulic components being used to carry out the logical functions.

Upon receipt of a sufficiently intense signal from photocell 80, adjustable gating unit 120 provides an amplified signal to stop control 122, which causes cylinders 40 and 44 to be locked in position, stopping the table. Racks 30 and 34 are closed against their mating racks, accurately aligning the table, any error being taken up in the compliant couplings. Considering the case in which slot 72 is of the form 72a, and in which the table had been moving in, e.g., the direction from hole 94c toward 94a, either switch 102b or 102d will be closed—e.g. 102b if a right turn is desired. In turn, direction control relay 124b will close. At the same time, memory 125 causes direction control relay 124d—which represents the trailing direction along the intended axis of table movement after the turn—to be latched in an open position. Gate relay 126, upon receipt of signals from stop control 122 and switch 102b, in turn enables the closing of corresponding work cycle relay 128b. The actuation of only a single work cycle relay prevents actuation of tool control relay 130, so that tool 48 does not operate. Instead, timing unit 132, after a predetermined delay, interrupts the output of stop control 122, causing rack 30 to open and cylinder 44 to be actuated for a right turn movement of the table. Memory 125 is cleared by unit 134, except that trailing direction relay 124d remains latched open.

In the event that the next slot 72 to align with hole 92 is of the form 72b, the operation just described will vary in the following respects. Since two switches, 102d and 102b, will now be closed, two corresponding work cycle relays, 128d and 128b, will close, causing work tool relay 130, and hence tool 48, to be actuated. By appropriate circuitry, including a limit switch (not shown) operated by movement of tool 48, the output of timing unit 132 is delayed until the return of tool 48. Since relay 124d is still latched open, directional information to the controls for cylinders 40 and 44 will unambiguously signal continued movement in the direction of hole 94b.

When the aligned slot is of the form 72c operation is much the same, except that a turn is carried out and a new trailing direction closed relay is latched open, the previously latched direction control relay being unlatched upon clearing of the memory.

Gating unit 120 is preferably set to provide an output when 50 percent of a hole 56 overlaps hole 92, to accommodate the time delay required to stop the table.

Pushbutton 140 is provided to initially energize the system.

Other embodiments will occur to those skilled in the art and are within the following claims.

What is claimed is:

1. In apparatus comprising a worktable, a tool unit for carrying out a work cycle, an X drive unit for causing relative table-to-tool movement along an X axis, and a Y drive unit for causing relative table-to-tool movement along a Y axis perpendicular to said X axis, that improvement consisting of indexing and cycling mechanism for controlling said movement and said cycle, comprising a template having first and second physical characteristics each varying along both said axes in accordance with the desired pattern of said movement and said cycling, a first sensor unit responsive to said first physical characteristic to provide table stop signals, a second sensor unit responsive to said second physical characteristic to provide table direction signals and work cycle signals and comprising four individual sensors respectively corresponding to the four directions along said axes, said template and said sensor units being mounted to undergo relative sensor-to-template movement in precise correspondence to said relative table-to-tool movement, and logic circuitry responsive to said sensor units, to cause said drive units to stop said relative movements in response to a said table stop signal, to cause said tool unit to carry out said work cycle in response to a said work cycle signal, and to cause said drive units to renew said relative movements in accordance with said table direction signals, said template having a plurality of first local areas in which said first physical characteristic has a difference from the remainder of said template which difference is detectable by said first sensor unit and a plurality of second local areas, extending from said first local areas in the respective directions of desired renewal of said relative movements, in which said second physical characteristic has a difference from the remainder of said template which difference is detectable by said second sensor unit, each said second local area being arranged to align with a single individual sensor of said second sensor unit upon alignment of the corresponding first local area with said first sensor unit, said logic circuitry being responsive to simultaneous alignment of a pair of said individual sensors with a pair of said second local areas to cause said tool unit to carry out said work cycle.

2. The improvement of claim 1 wherein said first physical characteristic comprises transmissivity of said template to light and said first sensor unit comprises a photosensitive device.

3. The improvement of claim 2 wherein said template comprises a plate having a rectangular grid of uniformly spaced holes, and a program mask for selectively optically exposing some of said spaced holes and covering others thereof.

4. The improvement of claim 2 wherein said second physical characteristic comprises transmissivity of said template to air and said second sensor unit comprises a pressure sensitive device.

5. The improvement of claim 1 wherein said logic circuitry includes a memory responsive to a said individual sensor aligned with a said second local area to prevent a said additional second local area adjacent a subsequent first local area with which said first sensor unit is aligned from effectively causing said individual sensor to provide a said table direction signal.

6. The improvement of claim 1 wherein said characteristics vary discontinuously.

* * * * *